United States Patent [19]

Balloni et al.

[11] Patent Number: 4,956,232

[45] Date of Patent: Sep. 11, 1990

[54] MULTI-LAYER HEAT-SEALABLE POLYPROPYLENE FILMS

[75] Inventors: Ricardo Balloni, Fairport, N.Y.; Kevin M. Donovan, Milford, Conn.; Jay K. Keung, Macedon, N.Y.

[73] Assignee: Mobil Oil Corporation, New York, N.Y.

[21] Appl. No.: 290,131

[22] Filed: Dec. 27, 1988

[51] Int. Cl.$^5$ ............ C09J 7/02; B32B 27/08
[52] U.S. Cl. ............ 428/349; 428/354; 428/516; 428/522; 428/424.2
[58] Field of Search ............ 428/349, 354, 516, 424.2, 428/522

[56] References Cited

U.S. PATENT DOCUMENTS

| | | | |
|---|---|---|---|
| 4,652,489 | 3/1987 | Crass et al. | 428/349 |
| 4,659,612 | 4/1987 | Balloni et al. | 428/349 |
| 4,695,503 | 9/1987 | Liu et al. | 428/316 |

Primary Examiner—Edith Buffalow
Attorney, Agent, or Firm—Alexander J. McKillop; Charles J. Speciale

[57] ABSTRACT

Multi-layer, heat-sealable polypropylene films are disclosed which possess good coefficient of friction, and thus good machinability, and which are also capable of forming good bonds with water based adhesives. The film structures consist essentially of (A) an outer heat sealable layer coextensively adherent to the upper surface of core layer (B), said outer layer (A) being formed from a polymer composition (a) consisting essentially of heat sealable resin compounded with one or more slip additives which are incompatible with polypropylene, (B) a core layer derived from a polymer composition (b) consisting essentially of an isotactic polypropylene compounded with one or more slip additives which are incompatible with polypropylene, and (C) an outer layer coextensively adherent to the lower surface of core layer (B), said outer layer (C) being formed from a polymer composition consisting essentially of isotactic polypropylene in the substantial absence of slip additives;

wherein the total amount of slip additive in said film structure is effective to provide the outer surface of outer layer (A) with a coefficient of friction sufficient for high speed heat sealing packaging operations but insufficient to cause substantial hazing of said structure.

27 Claims, No Drawings

MULTI-LAYER HEAT-SEALABLE POLYPROPYLENE FILMS

BACKGROUND OF THE INVENTION

This invention relates to multi-layer, heat-sealable polypropylene films which possess good slip properties and good adhesion to water based adhesives such as water based acrylics, urethanes and vinylidene chloride polymer (PVDC).

Polypropylene films possess a number of desirable characteristics including excellent optical properties such as transparency and brilliance, satisfactory mechanical properties such as tensile strength and Young's modulus, and substantial non-toxic and odorless properties. Accordingly, polypropylene films are widely used as packaging materials, especially for foods. One drawback of polypropylene films, however, is that they possess poor heat sealability. To remedy this, it is widely known to laminate a low-temperature heat-sealable resin to one or both sides of the polypropylene film by coating, laminating or coextruding. Such heat-sealable resins include, for example, middle and low density polyethylenes, ethylene-propylene copolymer, and terpolymers of ethylene, butene and propylene.

Another drawback of unmodified polypropylene films is that they exhibit relatively poor slip characterics, i.e., they exhibit high film to film coefficients of friction which makes it difficult to utilize them in automatic packaging equipment. The poor slip behavior of a film will interfere with its use in automatic processing equipment since the film must pass freely through the fabricating machine (e.g., heat sealer, bag maker, bag loader or filler, bag opener, overwrap package) for it to operate properly and reproducibly. In order to overcome the slip problems in heat-sealable films, it is common to incorporate one or more of several conventional slip additives, e.g., oleamide, stearic acid, erucamide and the like, in the heat-sealable film.

Although crystalline polypropylene films exhibit relatively low vapor permeability, it is often desired to further increase their gas and vapor barrier properties, especially for applications in which the films are being used to package products such as food items which are sensitive to, or attacked by, oxygen or moisture. It is well-recognized in the art that an effective means for increasing the gas and vapor barrier properties of oriented polypropylene films is to coat such films with polymers of vinylidene chloride.

It is important, when coating polypropylene films with such vinylidene chloride polymer compositions, to insure that the adhesion of the coating layer to the polypropylene substrate is adequate. For example, in many packaging applications, it is necessary for the coated film to be heat sealed either to itself or to other films to form a tightly closed package. If the coating adhesion to the base film is inadequate, the packages are liable to prematurely open when subjected to stress.

It has been the common understanding in the art that, to attain adequate adhesion between polypropylene film surfaces and water based adhesives, the film surfaces must be subjected to well known pretreatment operations such as, for example, treatment by corona discharge, flame or oxidizing chemicals. Other widely practiced means for improving the adhesion of the water based adhesives are the coating of the polypropylene film surface with specific primers or the co-lamination of the polypropylene film with an adhesion promotion film. Both coating or colamination methods, however, entail additional processing steps which increase the manufacturing costs of the films.

Even with pretreatment of the polypropylene film, such as by corona discharge, the adhesion of the water based adhesives to the polypropylene film surface will often not be satisfactory when the polypropylene film contains slip additives such as erucamide. Such slip additives tend to bloom or migrate to the surface of the polypropylene film where they act to greatly increase the variability of the bonds between the film and the water based adhesives.

There is therefore a need for a polypropylene films which can run well in packaging machines and which can also form good bonds with water based adhesives. Therefore, a film which exhibits the combined properties of low coefficient of friction and good adhesion to water based adhesives and which can be made in a single manufacturing step is greatly desired.

SUMMARY OF THE INVENTION

Multi-layer, heat-sealable polypropylene films have now been found which exhibit low coefficients of friction and good adhesion to water based adhesives including acrylics, urethanes and PVDC, and which can be made in a single manufacturing step. Such film structures consist essentially of (A) an outer heat sealable layer coextensively adherent to the upper surface of core layer (B), said outer layer (A) being formed from a polymer composition (a) consisting essentially of heat sealable resin compounded with one or more slip additives, (B) a core layer derived from a polymer composition (b) consisting essentially of an isotactic polypropylene homopolymer compounded with one or more slip additives, and (C) an outer layer coextensively adherent to the lower surface of core layer (B), said outer layer (C) being formed from a polymer composition consisting essentially of isotactic polypropylene homopolymer in the substantial absence of slip additives, wherein the total amount of slip additive in said film structure is effective to provide the outer surface of outer layer (A) with a coefficient of friction sufficient for high speed heat sealing packaging operations but insufficient to cause substantial hazing of said structure.

By virtue of the presence of slip additive in heat seal layer (A), and the migration of slip additive from layer (B) to the surface of layer (A), outer layer (A) possesses a low coefficient of friction which allows for excellent machinability of the films of this invention. Since the slip additive is one which is incompatible with polypropylene, it does not substantially migrate to the surface of outer layer (C) and thus does not interfere with good film-water-based adhesive bonding.

This invention therefore relates to such films and to such films to which a water-based adhesive coating has been applied.

DETAILED DESCRIPTION OF THE INVENTION

The isotactic polypropylene homopolymer of the core layer (B) and outer layer (C) is preferably a polypropylene having a density of from 0.88 to 0.94 g/cc and a melt flow index of from 1 to 10 g/10 mins. at 230° C./2.16 Kp/cm$^2$ pressure (as measured in accordance with ASTM D 1238).

The heat sealable resin in outer layer (A) can be any of the heat sealable copolymers, blends of homopolymers and blends of copolymer(s) and homopolymer(s) heretofore employed for this purpose. Illustrative of heat sealable copolymers which can be used in the heat sealable layer are ethylene-propylene copolymers containing from about 1.5 to about 10, and preferably from about 3 to about 5, weight percent, ethylene, copolymers of propylene and butene-1 containing from about 5 to about 40 weight percent butene-1, and ethylene-propylene-butene-1 terpolymers containing from about 1 to about 10, and preferably from about 2 to about 6, weight percent ethylene, from about 80 to 97, and preferably from about 88 to about 95, weight percent propylene, and from about 1 to about 20, and preferably from about 2 to about 15, weight percent butene-1.

Both core layer (B) and outer heat-sealable layer (A) are formed from polymer compositions containing slip additives which are incompatible with polypropylene. The percentage of the slip additive in the multi-layer structure should be such as to provide the outer surface of outer layer (A) with a coefficient of friction sufficient for high speed heat sealing packaging operations but insufficient to cause substantial hazing of the film structure. While the amount of slip additive is best defined by the result to be accomplished, it is preferred that this additive be included in the overall film structure in an amount of about 0.02% to about 0.20% by weight and even more preferred in amounts between about 0.025 and about 0.10% by weight. In the preferred embodiment, the amount of slip additive in the polymer composition from which core layer (B) is made is less than the amount of slip additive in the polymer composition from which layer (A) is made. More preferably, the composition from which core layer (B) is made contains about 400–800 ppm erucamide, and the polymer composition from which outer heat-sealable layer (A) is made contains about 1000–2000 ppm erucamide.

Slip additive in core layer (B) exudes from that layer through the outer heat-sealable layer (A) to the film's surface by "blooming" as is understood by those of skill in the art. In this manner, the additive present in core layer (B) becomes available at the surface of layer (A) so as to beneficially affect the coefficient of friction and anti-stick characteristics of the film structure. The slip additive preferentially blooms to the (A) layer and therefore is not present on the outer homopolymer surface of the (C) layer and does not adversely affect lamination bonds.

Generally, it is desired that the outer surface of outer layer (A) exhibit a coefficient of friction (ASTM D 1894) of less than about 0.45, preferably less than about 0.35 at room temperature.

Slip additives which may be used in making the films of this invention are those which are incompatible with polypropylene, i.e., those which bloom to the surface from the core and skin layers. Such additives are known to those skilled in the art. Non-ionic surfactants, such as the amides and carboxylic acids, are particularly of interest. Amides which are preferred are the amides of carboxylic acids having at least five carbon atoms, for example, behenamide, linolenamide, arachidamide, ricinol-amide, palmitamide, myristamide, linoleamide, lauramide, capramide, perlargonamide, caprylamide, oleamide, steramide, N,N'-ethylene bisoleamide, and the most preferred slip additive, erucamide. Carboxylic acids which are useful include those having at least four carbon atoms, for example, butyric, caproic, caprylic, capric, lauric, lauroleic, myristic, myristoleic, pentadecanoic, palmitic, palmitoleic, margaric, stearic, oleic, linoleic, linolenic, ricinoleic, 2,3-dihydroxystearic, 12-hydroxystearic, behenic, eleostearic, arachidic, 2-ecosenoic, 2,4-eicosadienoic, 2-docosenoic, 2-tetracosenoic, 2,4,6-tetracosatrienoic and the like.

The slip additive is preferably dry blended together with the polypropylene resin of layer (B) or the heat-sealable resin of layer (A) and then melt mixed. Alternatively, the additive can be incorporated into a minor portion of the resin as a master batch to form a high concentration mix of the additive and the resin. This may then be diluted to the appropriate proportion by the addition of more resin.

Outer layer (C) preferably contains an effective amount of one or more anti-block agents; heat-sealable layer (A) also preferably contains such agents. The anti-blocking agent preferred for inclusion in these outer layers may be any particulate inorganic material having a mean particle size ranging from about 0.5 to 5 microns. One commercially available silica (Kaopolite 1152, available from Kaopolite, Inc.) has a mean particle size of 0.8 microns and another (Sipernat 44, available from DeGussa Chemical Company) has a mean particle size of 4.0 microns. Either material, or mixtures thereof, can be employed. Metal silicates, silica glasses, clays and numerous other finely comminuted inorganic materials may also be used. The anti-blocking agent is preferably present in from about 0.05 to 0.5 wt. %, preferably about 0.1 to 0.3 wt. %, of the layers (A) and/or (C).

Microcrystalline wax is preferably incorporated into the outer heat sealable layer (A) as its inclusion permits the use of much lower amounts of slip additive than would otherwise be required and thus results in films with superior appearance and physical performance. This is so because slip additives such as the amides contribute to a hazy appearance of films. Useful waxes may be any of the known microcrystalline waxes. It is preferred, however, than synthetic n-paraffinic waxes be used. Preferably, the wax has a melting point between about 85° C. and about 165° C. The wax is preferably added in amounts between about 5% to about 15% by weight of the heat seal layer, and most preferably at about 10% by weight of that layer.

A further, preferred, additive for inclusion in the heat sealable layer (A) is glycerol monostearate or other monoglyceride which may preferably be included in amounts between about 0.05 and 0.3% by weight of the layer and most preferably at about 0.1% by weight.

The multi-layer films of this invention can be prepared employing commercially available systems for coextruding resins. The polymer compositions (a), (b) and (c) are preferably coextruded with one another. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet is then preferably reheated and stretched, e.g., 4 to 6 times in the machine direction at approximately 250° F. and subsequently, for example, 8 to 10 times in the transverse direction at approximately 320° F. The outer surface of layer (C) is then preferably treated by flame or corona to a surface activity of at least about 36 dynes/cm, preferably to approximately 40 dynes/cm. The edges of the film can be trimmed and the film wound onto a core. It is preferred that the thus-formed structure be conditioned or equilibrated by holding the same for a period of about one to three days at 100°–125° F. to promote migration of slip additive for coefficient of friction development.

The films described above are advantageous because they possess low coefficients of friction, enabling their use in automatic packaging equipment, and because they are also capable of forming good bonds with water based adhesives on the flame- or corona-treated surface of outer layer (C), i.e., in the range of about 80–150 g (measured using an Instron tester, bonds pulled along machine direction).

The composition of the water based adhesive is not critical to the practice of the invention. Commercially available acrylics, urethanes and vinylidene chloride latexes may be employed. Commercially available vinylidene chloride latexes generally have a vinylidene chloride content of at least 50% and preferably from about 75% to about 92% may be employed. The other ethylenically unsaturated comonomers may include alpha, beta ethylenically unsaturated acids, such as acrylic and methacrylic acids; alkyl esters containing 1–18 carbon atoms of said acids, such as, methylmethacrylate, ethyl acylate, butyl acrylate, etc. In addition, alpha, beta ethylenically unsaturated nitriles such as acrylonitricle and methacrylonitrile can be employed. In addition, monovinyl aromatic compounds such as styrene and vinyl chloride may be employed.

Specific vinylidene chloride polymer latexes contemplated comprise: 82% by weight vinylidene chloride, 14% by weight ethyl acrylate and 4% by weight acrylic acid. Alternatively, a polymer latex comprising about 80% by weight vinylidene chloride, about 17% by weight methyl acrylate and about 3% by weight methacrylic acid can likewise be employed.

The best mode for carrying out the instant invention presently contemplated by the inventors is a film of the following structure:

(A) An outer heat-sealable layer of 90% propylene/ethylene/butene-1 terpolymer and 10% microcrystalline wax; about 1600 ppm erucamide; about 1000 ppm glycerol monostearate (Myverol 1806, available from Eastman Chemnical) and about 3100 ppm silica anti-block particles (Syloid, available from W. R. Grace Corp.);

(B) A core layer of isotactic polypropylene containing 400–800 ppm erucamide;

(C) An outer layer of isotactic polypropylene containing about 2400 ppm silica anti-block particles with mean particle size about 0.8 microns (Sipernat 44) and about 3000 ppm silica anti-block particles with mean particle size about 4.0 microns (Kaopolite 1152), the outer surface of which layer is corona treated to about 40 dynes/cm.

This invention is further illustrated by the following examples.

EXAMPLE 1

Three films were made using the following procedure: The manufacturing process consisted of coextruding the outer layers (A) and (C) with the isotactic polypropylene core layer (B). The core resins were Fina 8670C, which contains erucamide, and a standard isotactic non-erucamide polypropylene, for example Fina 828 (Fina resins are available from Fina Oil & Chemicals Co., Dallas, Tex.) The (A) layer was melted and coextruded with the core and (C) layer. The (C) layer was isotactic polypropylene containing 2400 ppm Sipernat 44 and 3000 ppm Kaopolite 1152 antiblock particles. The (A) layer was extruded in the same manner, and was 90% Chisso terpolymer (propylene/ethylene/butene-1, available from Chisso Co.) and 10% microcrystalline wax, as well as a total of 1600 ppm erucamide, 1000 ppm Myverol 1806 antistatic agent and 3100 ppm Syloid antiblock particles.

The three layer extrudate was quenched, reheated and stretched 4–6 times in the machine direction at approximately 250° F. Subsequently, the MD stretched sheet was stretched 8–10 times in the transverse direction at approximately 320° F. The (C) layer was treated by flame or corona to approximately 40 d/cm and was would into mill roll form. The film was then stored at 100°–125° F. for 1–3 days to promote the migration of erucamide.

Film 1-A—This film was a two-layer film having a heat-sealable layer of 3.5% random ethylene propylene conventional copolymer and a layer of isotactic polypropylene which has no erucamide or other slip additives. The film was corona treated on the homopolymer side and coated with PVDC (Morton 2015).

Film 1-B—This film was a three-layer structure with an outer layer (i) containing 50% propylene/ethylene/butene-1 terpolymer, 40% of 3.5% random ethylene/propylene conventional copolymer, and 10% microcrystalline wax plus antiblocking and slip agents; a core layer (ii) of conventional isotactic polypropylene with 400–700 ppm erucamide; and an outer heat-seal layer (iii) of 90% propylene/ethylene/-butene-1 terpolymer, 10% microcrystalline wax plus slip and antiblocking agents. The layer (i) was corona treated and coated with PVDC (Grace 8600).

Film 1-C—This film was the same as Film 1-B except that the outer layer (i) was 100% isotactic polypropylene plus 3000 ppm Kaopolite 1152 and 2400 ppm Sipernat 44 antiblock particles. The homopolymer layer was corona treated and coated with PVDC (Grace 8600).

Saran lamination bond strengths of the laminates were tested by cutting one inch strips of the laminates and testing in an Instron tensile tester. Alternatively, a Sutter tested could be used for determing lamination bonds. Properties of Films 1-A, 1-B and 1-C are presented in Table 1.

TABLE 1

| Film Bonds | Lamination COF[a] | Saran Lamination |
|---|---|---|
| 1-A grams/in | .7–1.0 | 100–400 |
| 1-B grams/in | .25–.45 | 10–150 |
| 1-C grams/in | .25–.35 | 80–150 |

[a]Film is laminated to itself

The data presented in Table 1 indicate that the films 1-A and 1-B are unacceptable. Film 1-A exhibited acceptable saran bond strengths, but its COF was too high for packaging machine performance. Film 1-B exhibited acceptable COF, but its PVDC bond strengths were too inconsistent. The film of this invention, Film 1-C, exhibited both acceptable high barrier saran bond strength and acceptable COF. All films exhibited satisfactory wettability and adhesion.

EXAMPLE 2

Additional films were manufactured using the general method described in Example 1 to illustrate deficiencies of films not having the structure of the claimed films.

Film 2-A—This film was a three-layer film comprising a core of isotactic polypropylene with no additives and two outer layers of typical random copolymer or terpolymer heat-sealable layer. Silicone fluid was added to the outer layers for lubricity.

Film 2-B—This film was an ABA structure with the core (B) layer containing 2000 ppm erucamide, and the (A) layers being conventional 3.5% random ethylene-/propylene copolymers.

Properties of these films are presented in Table 2.

TABLE 2

| Film Bonds | Lamination COF$^a$ | Saran Lamination |
|---|---|---|
| 2-A | .30–.40 | 0–25 gm/in |
| 2-B | .20–.50 | 20–100 gm/in |

$^a$Film is laminated to itself

The data in Table 2 indicate that Film 2-A exhibited good coefficient of friction but very poor PVDC bonds. Film 2-B exhibits good coefficient of friction but its PVDC bonds are too inconsistent. These examples highlight the need to minimize the amount of erucamide in the outer (C) layer and the need to have a sufficient concentration in the other surface for acceptable packaging machine performance.

What is claimed is:

1. A heat-sealable multi-layer film structure consisting essentially of
   (A) an outer heat sealable layer coextensively adherent to the upper surface of core layer (B), said outer layer (A) being formed from a polymer composition (a) consisting essentially of heat sealable resin compounded with one or more slip additives which are incompatible with polypropylene,
   (B) a core layer derived from a polymer composition (b) consisting essentially of an isotactic polypropylene homopolymer compounded with one or more slip additives which are incompatible with polypropylene, and
   (C) an outer layer coextensively adherent to the lower surface of core layer (B), said outer layer (C) being formed from a polymer composition (c) consisting essentially of isotactic polypropylene homopolymer in the substantial absence of slip additives; wherein the total amount of slip additive in said film structure is effective to provide the outer surface of outer layer (A) with a coefficient of friction sufficient for high speed heat sealing packaging operations but insufficient to cause substantial hazing of said structure.

2. The film of claim 1 wherein said heat sealable resin is a terpolymer of propylene, ethylene and 1-butene.

3. The film of claim 2 wherein said terpolymer comprises about 80–97 wt. % propylene, about 1–10 wt. % ethylene, and about 1–20 wt. % butene-1.

4. The film of claim 3 wherein said terpolymer comprises about 88–95 wt. propylene, about 2–6 wt. % ethylene, and about 2–15 wt. % butene-1.

5. The film of claim wherein said heat sealable resin is an ethylene-propylene copolymer containing about 1.5 to 10 wt. % ethylene.

6. The film of claim 5 in which said ethylenepropylene copolymer contains about 3 to 5 wt. % ethylene.

7. The film of claim 1 wherein said heat sealable resin is a propylene-butene-1 copolymer containing about 5 to 40 weight percent butene-1.

8. The film of claim 1 wherein said heat sealable layer (A) further contains between about 5–15 wt. % microcrystalline wax.

9. The film of claim 1 wherein said heat sealable layer (A) further contains about 0.05 to 0.3 wt. % glycerol monostearate.

10. The film of claim wherein said heat sealable layer (A) further contains about 0.05–5 wt. % anti-block particles having a mean particle size in the range of about 0.5 to 5 microns.

11. The film of claim 10 wherein said anti-block particles are silica particles.

12. The film of claim 1 wherein the amount of slip additive in polymer composition (b) is less than the amount of slip additive in polymer composition (a).

13. The film of claim 1 wherein the slip additive in compositions (a) and (b) is erucamide.

14. The film of claim 13 wherein said composition (a) contains about 1000 to 2000 ppm erucamide and said composition (b) contains about 400 to 800 ppm erucamide.

15. The film of claim 1 wherein said polymer composition (c) further contains about 0.05–0.5 wt. % anti-block particles having a mean particle size ranging from about 0.5 to 5 microns.

16. The film of claim 15 wherein said anti-block particles are silica particles.

17. The film of claim 1 wherein the outer surface of outer layer (A) exhibits a coefficient of friction of less than 0.45 at room temperature.

18. The film of claim 17 wherein the outer surface of outer layer (A) exhibits a coefficient of friction of less than 0.35 at room temperature.

19. The film of claim 1 wherein the outer surface of outer layer (C) has a surface activity of at least about 36 dynes/cm.

20. The film of claim 1 which further comprises, adjacent to the outer surface of outer layer (C), a coating of water based adhesive.

21. The film of claim 20 in which said water based adhesive is selected from acrylics, urethanes, and vinylidene chloride polymer.

22. The film of claim 20 in which the strength of the bond between said water based adhesive coating and said outer layer (C) is about 80–150 g/in.

23. The film of claim 1 wherein said heat-sealable resin is a terpolymer of propylene, ethylene and 1-butene comprising about 88–95 wt. % propylene and about 2–6 wt. % ethylene; said heat sealable layer (A) further contains between about 5–15 wt. % microcrystalline wax, and about 0.05 to 0.3 wt. % glycerol monostearate; polymer compositions (a) and /(c) contain silica anti-block particles having a mean particle size of about 0.5 to 5 microns; and polymer composition (a) contains about 1000 to 2000 ppm erucamide and composition (b) contains about 400 to 800 ppm erucamide.

24. The film of claim 23 wherein the outer surface of outer layer (C) exhibits a coefficient of friction of less than 0.3 at room temperature.

25. The film of claim 23 which further comprises, adjacent to the outer surface of outer layer (C), a coating of water based adhesive.

26. The film of claim 25 in which said water based adhesive is vinylidene chloride copolymer.

27. The film of claim 26 in which the strength of the bond between said vinylidene chloride polymer coating and said outer layer (C) is about 80–⅛g/in.

* * * * *